United States Patent
Nielsen

(10) Patent No.: US 10,721,798 B2
(45) Date of Patent: Jul. 21, 2020

(54) ELECTROLUMINESCENT ASSEMBLY

(71) Applicant: Olivier Nielsen, Tarbes (FR)

(72) Inventor: Olivier Nielsen, Tarbes (FR)

(73) Assignee: ADHETEC, Tarbes (FR)

( * ) Notice: Subject to any disclaimer, the term of this patent is extended or adjusted under 35 U.S.C. 154(b) by 0 days.

(21) Appl. No.: 16/554,355

(22) Filed: Aug. 28, 2019

(65) Prior Publication Data

US 2020/0077488 A1     Mar. 5, 2020

(30) Foreign Application Priority Data

Aug. 29, 2018 (FR) ..................... 18 57751

(51) Int. Cl.
| | |
|---|---|
| *H05B 33/26* | (2006.01) |
| *B32B 37/12* | (2006.01) |
| *B32B 37/14* | (2006.01) |
| *G06F 1/16* | (2006.01) |
| *H05B 33/06* | (2006.01) |
| *H05B 33/10* | (2006.01) |

(52) U.S. Cl.
CPC ......... *H05B 33/26* (2013.01); *B32B 37/1284* (2013.01); *B32B 37/144* (2013.01); *G06F 1/1607* (2013.01); *H05B 33/06* (2013.01); *H05B 33/10* (2013.01); *B32B 2307/412* (2013.01); *B32B 2307/422* (2013.01)

(58) Field of Classification Search
CPC ........ H05B 33/26; H05B 33/06; H05B 33/10; B32B 37/1284; G06F 1/1607
See application file for complete search history.

(56) References Cited

U.S. PATENT DOCUMENTS

| | | | | |
|---|---|---|---|---|
| 8,575,631 | B2 * | 11/2013 | Yamazaki | ........... H01L 27/3202 257/88 |
| 2003/0129297 | A1 * | 7/2003 | Jakobi | ...................... C09D 5/22 427/66 |
| 2018/0002033 | A1 | 1/2018 | Loubiere et al. | |

FOREIGN PATENT DOCUMENTS

| | | |
|---|---|---|
| EP | 2437578 A1 | 4/2012 |
| FR | 2816745 A1 | 5/2002 |
| JP | 2001-15264 A | 1/2001 |
| WO | 2004/064020 A1 | 7/2004 |
| WO | 2009/074266 A1 | 6/2009 |

OTHER PUBLICATIONS

Rapport de Recherche Préliminaire/Opinion Écrite dated Jul. 5, 2019, issued in priority French Application No. 1857751, filed Aug. 29, 2018, 8 pages.

* cited by examiner

*Primary Examiner* — Anne M Hines
(74) *Attorney, Agent, or Firm* — Christensen O'Connor Johnson Kindness PLLC

(57) ABSTRACT

An electroluminescent assembly comprising at least one male electroluminescent device and a female electroluminescent device; the male electroluminescent device comprising: a first male connection zone, wherein a first male connector is in contact with the first conductive layer of the male electroluminescent device, and a second male connection zone, wherein a second male connector is in contact with the second conductive layer of the male electroluminescent device; the first male connector being connected to the first conductive layer of the female electroluminescent device, and the second male connector being connected to the second conductive layer of the female electroluminescent device.

12 Claims, 5 Drawing Sheets

ELECTROLUMINESCENT ASSEMBLY

1. TECHNICAL FIELD OF THE INVENTION

Figure 1:
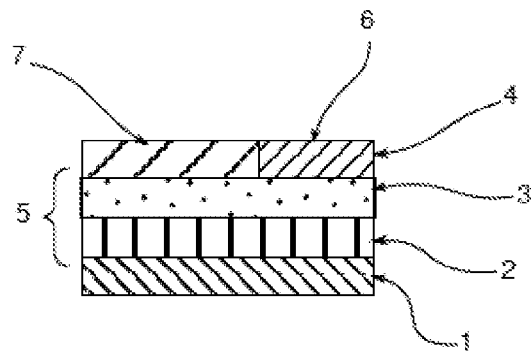

The invention relates to a electroluminescent device, a electroluminescent assembly, as well as to a method for producing a electroluminescent device.

2. TECHNOLOGICAL BACKGROUND

Electroluminescence is a physical phenomenon by which a material, subjected to an electric current or a strong electric field, emits light. For forty years, numerous devices using electroluminescence have been developed.

Typically, electroluminescent devices comprise a stack of successive layers, composed of a layer comprising electroluminescent material and a layer comprising at least one dielectric sandwiched between two conductive layers, also termed electrodes, of which at least one is transparent.

Electroluminescent technology finds its main application in display devices, where its relatively low energy consumption, relative luminosity and capacity to form relatively thin layers makes it a particularly suitable light source.

However, the applications of current electroluminescent devices remain limited, due to the production methods thereof.

Indeed, these electroluminescent devices are usually produced by using squeegee coating and printing methods such as screen printing or, more recently, inkjet printing. These methods are suitable for producing uniform electroluminescent devices, of simple and flat shapes, but do not make it possible for a large-volume production of complex shape devices.

3. SUMMARY OF THE INVENTION

In order to resolve the disadvantages encountered with known electroluminescent devices, the inventors have come up with a electroluminescent assembly which could have a complex shape and/or a significant size. The electroluminescent assembly according to the invention is also suitable to be fixed on a substrate having a non-flat topology, in particular concave or convex.

To do this, the electroluminescent assembly according to the invention comprises at least:
- a electroluminescent device, termed male electroluminescent device, and
- a electroluminescent device, termed female electroluminescent device,
  - the male electroluminescent device and the female electroluminescent device each comprising:
  - a electroluminescent zone, wherein:
  - a core comprising a electroluminescent layer covering a dielectric layer is sandwiched between a first conductive layer, and a second conductive layer,
  - the male electroluminescent device further comprising:
  - a first male connection zone, wherein a first male connector is in contact with the first conductive layer of the male electroluminescent device, and
  - a second male connection zone, wherein a second male connector is in contact with the second conductive layer of the male electroluminescent device;
  - the first male connector being connected to the first conductive layer of the female electroluminescent device, and
  - the second male connector being connected to the second conductive layer of the female electroluminescent device.

The electroluminescent assembly according to the invention is therefore composed of electroluminescent devices (male and female electroluminescent device(s)), assembled so as to conserve an electric and visual continuity, such that the electroluminescent assembly has the conventional properties of electroluminescent devices, but this over significant extents and/or of complex shape.

The electroluminescent assembly is intended to be fixed on a substrate. The substrate can be all or some of the surface of a given part, for example a part of a vehicle, such as an aircraft or a car.

In the following description, the terms "above", "below", "upper", "lower" and similar are used to define a relationship between the different layers or films constituting the electroluminescent device according to the invention and/or the respective faces thereof, by reference to a normal axis to the surface of the substrate, on which the electroluminescent device or assembly must be fixed and oriented from the substrate outwards from the electroluminescent device or assembly.

By "cover", this means "cover all or some", unless this is specified otherwise.

The male electroluminescent device and the female electroluminescent device forming the electroluminescent assembly both comprise: a electroluminescent zone. This electroluminescent zone comprises a core comprising a electroluminescent layer covering a dielectric layer. The core is sandwiched between a first conductive layer, and a second conductive layer. Typically, the first conductive layer is in contact with the dielectric layer and the second conductive layer is in contact with the electroluminescent layer. Advantageously, the male electroluminescent device and/or the female electroluminescent device also comprise an adhesive layer and/or a protective layer. When the different layers or zones of the male or female electroluminescent devices must be differentiated, they are termed male or female according to which they belong respectively to a male or female device.

The adhesive layer of a electroluminescent device according to the invention (male, female, mixed or other), more specifically the upper face of the adhesive layer, is in contact with the first conductive layer at the level of the electroluminescent zone. Preferably, the adhesive layer is in contact with the first conductive layer over the whole lower face of the latter.

The adhesive layer is intended to be in contact with the substrate at the level of the lower face thereof. It makes it possible for the adhesion between the substrate and the layers of the electroluminescent device which itself are greater. It is preferably non-conductive or comprises a non-conductive zone. Preferably, the adhesion of the lower face of the adhesive layer is a pressure-sensitive adhesive. According to an embodiment of the invention, the adhesive layer is formed of a support film covering an adhesive film. The support film can in particular be used as a basis for the deposition of different layers of the device, when the latter is produced by the deposition of a stack of layers, going from the first conductive layer to the second conductive layer. The support film is generally a paper film, a plastic film, for example made of polyethylene terephthalate (PET), polyethylene terephthalate/indium-tin oxide (PET/ITO), thermoplastic polyurethane (TPU), polyvinyl chloride (PVC), glass or polycarbonate (PC).

The electroluminescent device according to the invention can also comprise a protective sheet in contact with the adhesive layer. The protective sheet makes it possible to handle the electroluminescent device without the handler being in contact with the adhesive substance of the adhesive layer. It is removed at the time of the application of the electroluminescent device on the substrate.

Preferably, the protective sheet is made of polyester or another polymer, for example selected from the group consisting of polyolefin, polyimide and fluorinated polymer (for example, of polyvinyl fluoride (PVF) type, polyvinylidene fluoride (PVDF) or silicone paper).

The first conductive layer forms a lower electrode of the male or female electroluminescent device.

The first conductive layer comprises at least one conductive material. Preferably, the conductive material of the first conductive layer comprises a metal, for example a metal selected from the group consisting of copper, silver, aluminium, tin or a mixture of the latter. According to a preferred embodiment, the conductive material of the first conductive layer is suitable for being sprayed. Also, the conductive material can comprise metal in solution in a solvent, for example an aqueous solvent such as alcohol. The first conductive layer can also be a metal plating.

The first conductive layer can be transparent or opaque. Preferably, the first conductive layer is opaque.

The first conductive layer is covered by a dielectric layer, at least at the level of the electroluminescent zone.

The dielectric layer of a electroluminescent device according to the invention (male, female, mixed and/or other) makes it possible to ensure electric insulation between the two conductive layers. Indeed, the first and second conductive layers must not be in contact. In addition, due to the properties of the dielectric materials, the dielectric layer improves the performances of the electromagnetic field between the first and the second conductive layers, when an electric signal is applied between these layers.

The dielectric layer can comprise a material selected from the group consisting of titanate, niobate, aluminate, tantalate and zirconate or a mixture thereof.

The dielectric layer and the electroluminescent layer form, at both, the core of the electroluminescent devices according to the invention. At least at the level of the electroluminescent zone, the dielectric layer is covered by a electroluminescent layer. The core of the luminescent device here is sandwiched between two conductive layers (the first and the second conductive layers). Each conductive layer comprising a distal face and a proximal face of the core of the electroluminescent device. Also, at the level of the electroluminescent zone, the first conductive layer is in contact with the dielectric layer at the level of the proximal face thereof, corresponding to the upper face thereof by reference to an axis normal to the surface of the substrate and oriented from the substrate outwards from the electroluminescent device. The second conductive layer, is in contact with the electroluminescent layer at the level of the proximal face thereof corresponding to the lower face thereof by reference to an axis normal to the surface of the substrate to an axis normal to the surface of the substrate and oriented from the substrate outwards from the electroluminescent device.

The electroluminescent layer of a electroluminescent device according to the invention (male, female, mixed and/or other) comprises at least one luminophore. The luminophore can be selected from the group consisting of zinc sulphide doped with a metal—such as at least one of copper, manganese, boron-doped diamond, semi-conductor of type III-V—like indium phosphorus (InP), gallium arsenide (GaAs), gallium nitride (GaN)—organic semi-conductor—such as $[Ru(2,2'\text{-bipyridine})_3]^{2+}(PF6^-)^{2-}$, where the notation or of a mixture of these.

As an example, the luminescent layer can comprise zinc sulphide doped with a metal such as copper or silver in solution in a copolymer and ammonium hydroxide mixture.

The electroluminescent layer is covered by the second conductive layer at least at the level of the electroluminescent zone.

The second conductive layer forms an upper electrode of the male or female electroluminescent device.

The second conductive layer can be of materials selected from the group consisting of conductive polymers, carbon nanotubes, antimony and tin oxide, indium and tin oxide (ITO), poly(3,4-ethylenedioxythiophene and sodium poly (styrene sulfonate) (PEDOT:PSS), metal mesh and PEDOT:PSS, silver nanowires, aluminium-doped zinc oxide (AZO) nanoparticles and zinc oxide.

Advantageously, the second conductive layer is transparent. It can be totally or partially transparent. Indeed, the second conductive layer must both be conductive and transparent, such that, on the one hand, light is generated by the electroluminescent layer and that, on the other hand, this light passes through the electroluminescent device via the second conductive layer. Yet, it is difficult to obtain a second conductive layer having both good transparency and conductivity properties overall. Also, the second conductive layer can comprise a transparent portion and a conductivity portion greater than the conductivity of the transparent portion. The transparent portion is intended to let light emitted by the electroluminescent layer pass through and the conductivity portion greater than that of the transparent portion, suitable for driving the current at the same impedance as that of the first conductive layer. This conductivity portion greater than that of the transparent portion can be opaque. It is preferably positioned at the periphery of the transparent portion. It can also be applied on a portion of the transparent portion or conversely, the conductivity portion greater than that of the transparent portion can be applied on a portion of the transparent portion.

The conductivity portion greater than that of the transparent portion can, for example, be a bus bar formed of a strip of conductive material with a relatively low impedance.

The electroluminescent device according to the invention (male, female, mixed and/or other) can further comprise a protective layer.

The protective layer is intended to protect the upper face of the electroluminescent device according to the invention.

The protective layer covers the second conductive layer, at least at the level of the electroluminescent zone.

The protective layer is preferably non-conductive or comprises a non-conductive zone. It is thus used to electrically insulate the second conductive layer of the electroluminescent device according to the invention of the environment.

The protective layer can also be used as a support layer for depositing different layers of the electroluminescent device according to the invention, when the latter is produced by the deposition of a superposition of layers going from the second conductive layer to the first conductive layer.

The protective layer can be made of plastic.

Preferably, the protective layer is transparent.

The male electroluminescent device of the electroluminescent assembly according to the invention comprises:

a first male connection zone, wherein a first male connector is in contact with the first conductive layer of the male electroluminescent device, and a second male connection zone, wherein a second male connector is in contact with the second conductive layer of the male electroluminescent device.

The first and/or the second connector can be, for example, made of conductive adhesive, more specifically made of adhesive sensitive to the conductive pressure or made of a conductive resin, for example made of a conductive epoxy resin.

Male Electroluminescent Device

The present invention relates to a male electroluminescent device comprising:
- a male electroluminescent zone, wherein:
  - a core, termed male core, comprising a electroluminescent layer, termed male electroluminescent layer, covering a dielectric layer, termed male dielectric layer, is sandwiched between a first conductive layer, termed first male conductive layer, and a second conductive layer, termed second male conductive layer,
- the male electroluminescent device further comprising:
  - a first male connection zone, wherein a first male connector is in contact with the first male conductive layer, and is intended to be connected to a first female conductive layer of a female electroluminescent device, and
  - a second male connection zone, wherein a second male connector is in contact with the second male conductive layer and is intended to be connected to a second female conductive layer of a female electroluminescent device.

The male electroluminescent device is intended to be connected to a female electroluminescent device to form a electroluminescent assembly.

The electroluminescent zone and the different layers forming the male electroluminescent device can be such as defined in the preceding chapter.

The first male connector is used to ensure the electric connection between the first conductive layer of the male electroluminescent device with which it is in contact and the first conductive layer of the female electroluminescent device. The connection between the first male connector and the first conductive layer of the female electroluminescent device can be direct by contact together or indirect, via an additional connector such as, for example, a first female connector of the female electroluminescent device.

Regarding the second male connector, it is used to ensure the electric connection between the second conductive layer of the male electroluminescent device with which it is in contact and the second conductive layer of the female electroluminescent device. The connection between the second male connector and the second conductive layer of the female electroluminescent device can be direct by contact together or indirect, via an additional connector such as, for example, that a second female connector of the female electroluminescent device.

Advantageously, the male electroluminescent device comprises an adhesive layer, termed male adhesive layer, and/or a protective layer, termed male protective layer.

According to a preferred embodiment, the first male connector is comprised in the male adhesive layer or the male protective layer and the second male connector is comprised in the male adhesive layer or the male protective layer.

According to a variant, the first male connector and the second male connector are comprised in the male adhesive layer.

According to another variant, the first male connector and the second male connector are comprised in the male protective layer.

The first male connector can be comprised in the male adhesive layer and the second male connector can be comprised in the male protective layer or the first male connector can be comprised in the male protective layer and the second male connector can be comprised in the male adhesive layer.

Advantageously, the male adhesive layer is non-conductive. If the male adhesive layer comprises one or more connector(s), it is advantageously non-conductive, except for one or more connector(s) that it comprises.

Likewise, advantageously, the male protective layer is non-conductive. If the male protective layer comprises one or more connectors, it is advantageously non-conductive, except for one or more male connector(s) and/or one or more connector(s) that it comprises.

Preferably, the second male conductive layer comprises at least:
- one male transparent portion, and
- one male portion of greater conductivity than the conductivity of the male transparent portion; the second male connector being in contact with the upper male conductivity portion of the second male conductive layer.

In order to protect and to insulate the first and/or second male connector of the environment, the male electroluminescent device can comprise, respectively, a first and/or second protective element covering the male connector in question. The protective element is preferably non-conductive. It can be removed without damaging the male connector in question.

To facilitate the removal thereof, the protective element can be connected to a flap.

Also, the first and/or the second protective element can each be connected to a flap, respectively the first and the second flap.

Female Electroluminescent Device

The invention also relates to a female electroluminescent device comprising:
- a female electroluminescent zone, wherein:
  - a core, termed female core comprising a electroluminescent layer, termed female electroluminescent layer, covering a dielectric layer, termed female dielectric layer, is sandwiched between a first conductive layer, termed first female conductive layer and a second conductive layer, termed second female conductive layer,
- a first female connection zone, wherein the first female conductive layer comprises a first female extension which extends beyond the female core and which is intended to be connected to the first male connector of a male electroluminescent device, and/or
- a second female connection zone, wherein the second female conductive layer comprises a second female extension which extends beyond the female core and which is intended to be connected to the second male connector of a male electroluminescent device.

Advantageously, the first female extension is not covered by the core of the female electroluminescent device and the second female extension does not cover the core of the female electroluminescent device.

The female electroluminescent device can comprise an adhesive layer, termed female adhesive layer. The female adhesive layer is in contact with the first conductive layer at least at the level of the electroluminescent zone.

The female electroluminescent device can also comprise a protective layer, termed female protective layer. The female protective layer is in contact with the second conductive layer at least at the level of the electroluminescent zone.

The female electroluminescent device is intended to be in contact with a male electroluminescent device to form a electroluminescent assembly.

According to an embodiment, the female electroluminescent device comprises a first female connection zone, wherein the first female conductive layer comprises a first female extension which extends beyond the female core and which is intended to be connected to the first male connector of a male electroluminescent device, and/or According to an embodiment, the female electroluminescent device comprises a second female connection zone, wherein the second female conductive layer comprises a second female extension which extends beyond the female core and which is intended to be connected to the second male connector of a male electroluminescent device.

According to an embodiment, the female electroluminescent device comprises a first female connection zone, wherein the first female conductive layer comprises a first female extension, which extends beyond the female core and which is intended to be connected to the first male connector of a male electroluminescent device and a second female connection zone, wherein the second female conductive layer comprises a second female extension which extends beyond the female core and which is intended to be connected to the second male connector of a male electroluminescent device.

The first extension of the female electroluminescent device is suitable for ensuring the electric connection between the first conductive layer of the female electroluminescent device and the first conductive layer of a male electroluminescent device via the first male connector of the latter. The connection between the first male connector and the first extension of the female electroluminescent device can be by direct contact together or indirect, via a connector.

Typically, the first extension is conductive.

According to an embodiment, all or some of the first extension is intended to be in direct contact with the first male connector.

According to an embodiment, the female protective layer is suitable such that the first conductive layer of the female electroluminescent device is connected to the first male connector of a male electroluminescent device. For example, the female protective layer can comprise an extension which extends beyond the core and the second conductive layer of the electroluminescent zone of the female electroluminescent device. This extension of the female protective layer can cover the first extension and comprise a first female connector intended to be in contact with the first male connector of a male electroluminescent device.

The female protective layer can also comprise a suitable second female connector, such that the second conductive layer of the female electroluminescent device is connected to the second male connector of a male electroluminescent device.

Outside of the possible female connector(s) thereof, the female protective layer is preferably non-conductive and is thus used to electrically insulate the second conductive layer of the female electroluminescent device from the environment.

The second extension of the female electroluminescent device is itself suitable for ensuring the electric connection between the second conductive layer of the female electroluminescent device and the second conductive layer of a male electroluminescent device via the second male connector of the latter. The connection between the second male connector and the second extension of the female electroluminescent device can be direct, by contact together, or indirect via a connector.

Typically, the second extension is conductive.

Preferably, the second extension is of a greater conductivity than the transparent portion of the second conductive layer of the female electroluminescent device.

According to an embodiment, all or some of the second extension is intended to be in direct contact with the second male connector.

According to another embodiment, the female adhesive layer is suitable, such that the second conductive layer of the female electroluminescent device is connected to the second male connector. For example, the female adhesive layer can comprise an extension which extends beyond the core and the first conductive layer of the electroluminescent zone of the female electroluminescent device. This extension of the female adhesive layer can be covered by the second extension and comprise a conductive portion, termed female conductive portion, intended to be in contact with the second male connector of a male electroluminescent device.

The female adhesive layer can also comprise a suitable first female connector such that the first conductive layer of the female electroluminescent device is connected to the first male connector of a male electroluminescent device.

Outside of the possible connector(s) thereof, the female adhesive layer is preferably non-conductive and is thus used to electrically insulate the first conductive layer of the female electroluminescent device of the environment. It furthermore makes it possible for the adhesion of the female electroluminescent device on the substrate and optionally on the male electroluminescent device.

Mixed Electroluminescent Device

The invention also relates to a mixed electroluminescent device. The mixed electroluminescent device according to the invention is both a male electroluminescent device according to the invention and a female electroluminescent device. Advantageously, the electroluminescent device is a female electroluminescent device according to the invention.

The mixed electroluminescent device has the features of a male electroluminescent device and those of a female electroluminescent device such that it can be connected to both a female electroluminescent device and a male electroluminescent device.

Thus, the mixed electroluminescent device can comprise:
- a electroluminescent zone, wherein:
  - a core comprising a electroluminescent layer covering a dielectric layer is sandwiched between a first conductive layer, and a second conductive layer,
- a first and a second male connection zone such as defined above, and
- a first and/or a second female connection zone such as defined above.

The mixed electroluminescent device can also comprise an adhesive layer and/or a protective layer.

According to an embodiment, the mixed electroluminescent device comprises a first female connection zone such as defined above.

According to an embodiment, the mixed electroluminescent device comprises a second female connection zone such as defined above.

According to an embodiment, the female electroluminescent device comprises a first and second female connection zone such as defined above.

Electroluminescent Device with Supply Zone(s)

The invention also relates to a electroluminescent device comprising:
- a electroluminescent zone, wherein:
- a core comprising a electroluminescent layer covering a dielectric layer is sandwiched between a first conductive layer and a second conductive layer,
- an adhesive layer, and
- a protective layer,
- the electroluminescent device further comprising:
- a first supply zone comprising a first supply connector in contact with the first conductive layer and intended to be connected to a first terminal of a supply and/or
- a second supply zone comprising a second supply connector in contact with the second conductive layer and intended to be connected to a second terminal of the supply.

The electroluminescent device can be a male, female or mixed electroluminescent device.

Preferably, the electroluminescent device can comprise a first supply zone comprising a first supply connector in contact with the first conductive layer and intended to be connected to a first terminal of a supply and a second supply zone comprising a second supply connector in contact with the second conductive layer and intended to be connected to a second terminal of the supply.

According to an embodiment, the first supply connector is comprised in the adhesive layer or the protective layer.

According to an embodiment, the second supply connector is comprised in the male adhesive layer or the male protective layer.

According to a variant, the first supply connector and the second supply connector are comprised in the male adhesive layer.

According to another variant, the first supply connector and the second supply connector are comprised in the male protective layer.

Electroluminescent Assembly

The present invention also relates to a electroluminescent assembly characterised in that it comprises at least:
- a electroluminescent device, termed male electroluminescent device, and
- a electroluminescent device, termed female electroluminescent device,
- the male electroluminescent device and the female electroluminescent device each comprising:
- a electroluminescent zone, wherein:
- a core comprising a electroluminescent layer covering a dielectric layer is sandwiched between a first conductive layer, and a second conductive layer,
- the male electroluminescent device further comprising:
- a first male connection zone, wherein a first male connector is in contact with the first conductive layer of the male electroluminescent device,
- a second male connection zone, wherein a second male connector is in contact with the second conductive layer of the male electroluminescent device;
- the first male connector being connected to the first conductive layer of the female electroluminescent device, and
- the second male connector being connected to the second conductive layer of the female electroluminescent device.

The electroluminescent assembly can comprise at least one male electroluminescent device and at least one female electroluminescent device connected together so as to ensure the electric continuity of the assembly.

The number of male or female electroluminescent devices is not limited. All that is needed, is just that the electric continuity between the different components of the electroluminescent assembly is ensured. So-called mixed electroluminescent devices, which comprise both a female portion and a male portion and which can thus be used for connection between a male electroluminescent device and a female electroluminescent device can also be comprised in the electroluminescent assembly.

The electroluminescent assembly can, in particular, be used as a display device.

Method for Producing a Male Electroluminescent Device

The invention also relates to a method for producing a male electroluminescent device comprising steps of:
- supplying an adhesive layer, termed male adhesive layer, comprising a first male connector and/or a second male connector,
- depositing on the male adhesive layer:
- a first conductive layer,
- a dielectric layer,
- a electroluminescent layer, and
- a second conductive layer,
- such that:
- the first male connector is in contact with the first male conductive layer, and/or
- the second male connector is in contact with the second male conductive layer.

In this production method, the male electroluminescent device is produced from the lowest layer intended to be in contact with the substrate (adhesive layer) to the highest layer intended to be farther away from the substrate (protective layer).

Preferably, the adhesive layer comprises a first and a second male connector. The first male connector is in contact with the first male conductive layer and the second male connector is in contact with the second male conductive layer.

The male adhesive layer comprising a first and/or a second male connector can be achieved:
- by supplying a male adhesive layer previously comprising a first and/or a second through cavity or wherein a first and/or a second through cavity has been bored, then
- by depositing a conductive material in each through cavity of the male adhesive layer so as to form a first and/or a second male connector there.

The lower orifice of each through cavity can be blocked by a protective element. Thus, each through cavity can be filled with a liquid conductive material and the lower face of the connector is protected. The protective element can be connected to a flap.

The conductive material deposited in the first and/or the second through cavity can be an adhesive conductive material. It can also be a conductive material strip or a plate, for example a copper strip or a plate. It can also be a strip or a plate of a conductive substance, for example a copper strip or a plate or a combination of these.

The deposition of a conductive material in each through cavity can also be carried out simultaneously to the deposition of the first conductive layer.

The deposition of the first conductive layer and incidentally that of the material of the connector(s) can be carried out by inkjet printing, screen printing, spraying, the technique termed "roll to roll", by brush or by syringe.

The step of depositing different layers on the male adhesive layer is carried out preferably by the successive deposition of each of the layers: first conductive layer, dielectric layer, electroluminescent layer, then second conductive layer.

The assembly of the layers is deposited on the adhesive layer so as to form a male electroluminescent zone, wherein the male core comprising the male electroluminescent layer covering the male dielectric layer is sandwiched between the first male conductive layer and the second male conductive layer.

The deposition step can also be carried out by the deposition of a stack of layers already constituted. Each layer can be achieved by inkjet printing, screen printing, spraying, or by the technique termed "roll to roll".

When the second conductive layer comprises a transparent portion and a conductive portion larger than that of the transparent portion, a zone corresponding to one of these two portions is protected by a mask, a first conductive material corresponding to the unprotected zone is applied on the electroluminescent layer, then the mask protecting the protected zone is removed and a second conductive material corresponding to the zone formerly protected is deposited.

The method can further comprise the deposition of a protective layer, termed male protective layer on the second conductive layer.

The invention also relates to another method for producing a male electroluminescent device. In this other production method, the male electroluminescent device is produced from the highest layer intended to be the farthest away from the substrate (protective layer) to the lowest layer intended to be in contact with the substrate (adhesive layer).

Also, a method for producing a male electroluminescent device according to the invention comprising steps of:
 supplying a protective layer, termed male protective layer, comprising a first male connector and/or a second male connector, termed male conductive portion,
 depositing on the male protective layer:
 a second conductive layer,
 a electroluminescent layer,
 a dielectric layer, and
 a first conductive layer,
 such that:
 the first male connector is in contact with the first male conductive layer, and/or
 the second male connector is in contact with the second conductive layer.

Preferably, the protective layer comprises a first and a second male connector. The first male connector is in contact with the first male conductive layer and the second male connector is in contact with the second male conductive layer.

The male protective layer comprising a first and/or a second male connector can be achieved:
 by supplying a male protective layer previously comprising a first and/or a second through cavity or wherein a first and/or a second through cavity has been bored,
 then by depositing a conductive material wherein each through cavity of the male protective layer so as to form a first and/or a second male connector there.

The orifice of each through cavity can be blocked by a protective element. Thus, the through cavity can be filled with a liquid conductive material and the face which will be the upper face of the conductive portion will be protected. The protective element can be connected to a flap.

The conductive material deposited in each through cavity can be an adhesive conductive material. It can also be a strip or a plate of a conductive substance, for example a copper strip or a plate or a combination of these.

The deposition of a conductive material in each through cavity of the male protective layer can also be carried out simultaneously to the deposition of the second conductive layer.

The deposition of the second conductive layer and incidentally that of the conductive portion can be carried out by inkjet printing, screen printing, spraying, by the technique, "roll to roll", by brush or by syringe.

When the second conductive layer comprises a transparent portion and a portion of conductivity greater than that of the transparent portion, a zone corresponding to one of these two portions is protected by a mask, a first conductive material corresponding to the unprotected zone is applied on the male protective layer, then the mask protecting the protected zone is removed and a second conductive material corresponding to the zone formerly protected is deposited.

The step of depositing different layers on the male protective layer is preferably carried out by the successive deposition of each of the layers: the second male conductive layer, the male electroluminescent layer, the dielectric layer, then the first male conductive layer, then optionally the male adhesive layer.

The deposition step can also be carried out by the deposition of a stack of layers already constituted.

Each layer of the superposition can be achieved by inkjet printing, screen printing, spraying or by the technique of "roll to roll".

The method can further comprise the deposition of an adhesive layer, termed male adhesive layer, on the first conductive layer.

Method for Producing a Electroluminescent Assembly

The invention also relates to the use of the male electroluminescent device according to the invention to form a electroluminescent assembly.

The invention also relates to a method for producing a electroluminescent assembly comprising a step of connecting the male electroluminescent device according to the invention to a female electroluminescent device so as to form a electroluminescent assembly.

The female electroluminescent device is preferably a female electroluminescent device according to the invention.

5. LIST OF FIGURES

Figure 5:
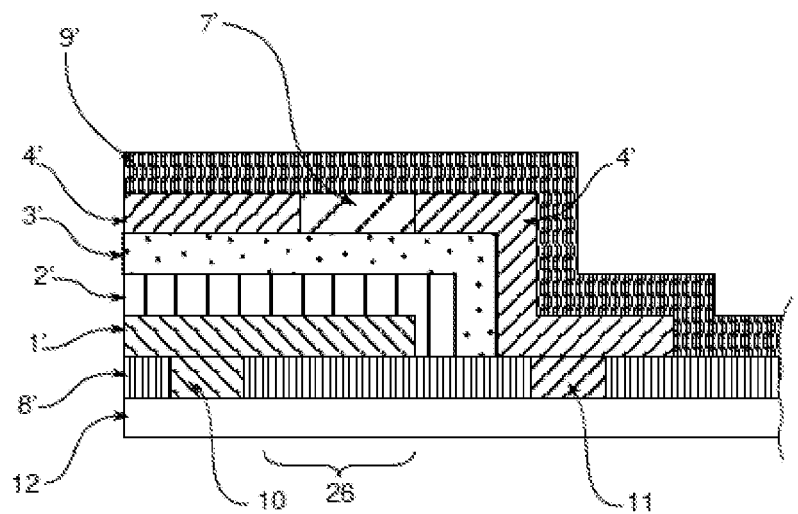
Figure 6:
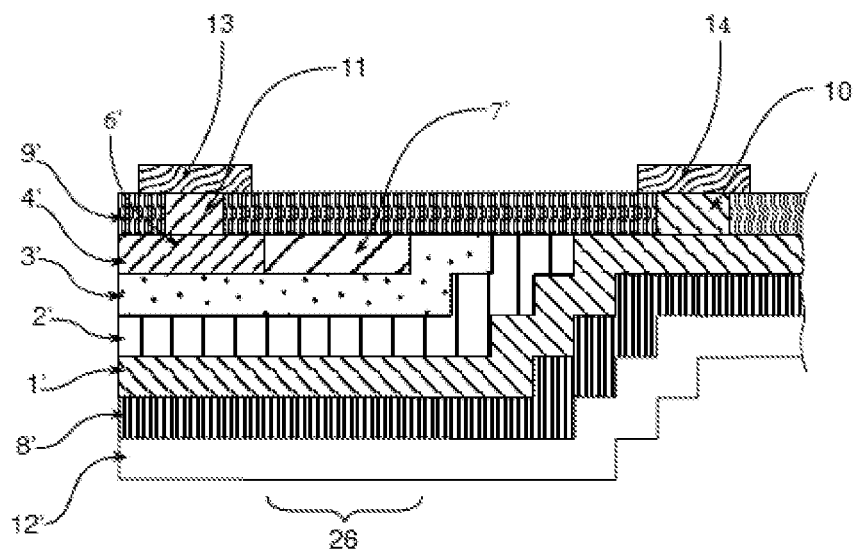
Figure 7:
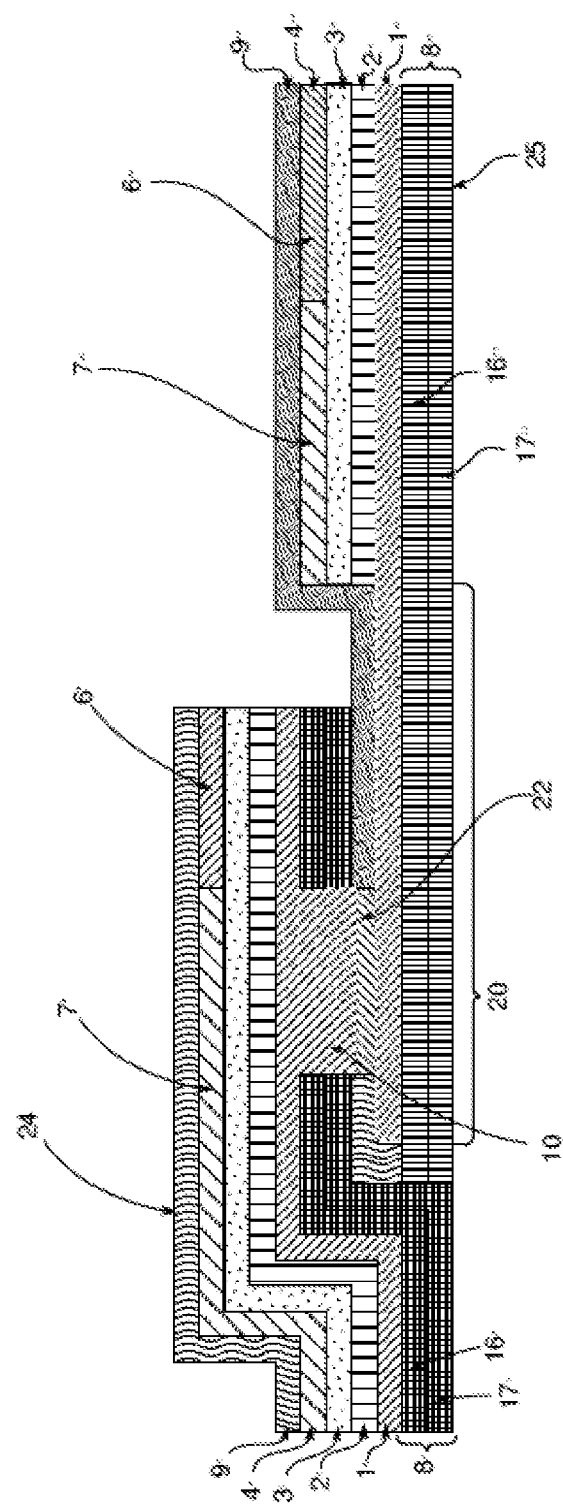
Figure 8:
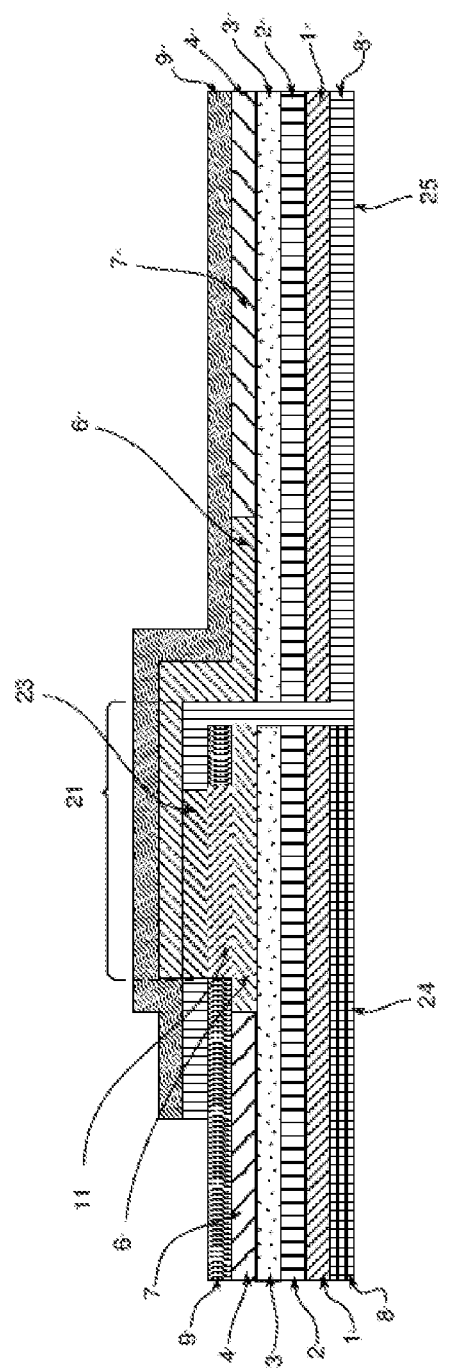

Other aims, features and advantages of the invention will appear upon reading the following description given only in a non-limiting manner and which refers to the appended figures, in which:

FIG. 1 is a schematic, cross-sectional view of a electroluminescent device according to the prior art, FIGS. 2 to 6 are partial, schematic and cross-sectional views of male electroluminescent devices according to different embodiments of the invention, FIG. 7 is a schematic, cross-sectional view of the connection between the first conductive layer of a male electroluminescent device and the first conductive layer of a female electroluminescent device according to an embodiment of the invention, FIG. 8 is a schematic, cross-sectional view of the connection between the second conductive layer of a male electroluminescent device and the second conductive layer of a female electroluminescent device according to an embodiment of the invention.

In the figures, the scales and the proportions are not strictly respected and this, for purposes of illustration and clarity. The invention is not limited to only the embodiments described.

6. DETAILED DESCRIPTION OF DIFFERENT EMBODIMENTS OF THE INVENTION

FIG. 1 represents a electroluminescent device according to the prior art. Such a device comprises a core 5 consisting of a electroluminescent layer 3 covering a dielectric layer 2.

The core 5 is sandwiched between two conductive layers: a first conductive layer 1 in contact with the dielectric layer 2 and a second conductive layer 4 in contact with the electroluminescent layer 3.

Also, the electroluminescent device is a stack of the second conductive layer 4 on the electroluminescent layer 3, itself on a dielectric layer 2, the dielectric layer 2 being on the first conductive layer 1.

The second conductive layer 4 comprises a transparent portion 7 and a portion 6 of which the conductivity is greater than the conductivity of the transparent portion 7.

In FIG. 1 and the following figures, the portion 6 of greater conductivity is illustrated schematically opposite the first conductive layer 1. This configuration is for purposes of illustration. In practice, the portion 6 of greater conductivity is not opposite the first conductive layer, in order to force the electric current to circulate in the transparent portion 7 and to not only circulate in the portion 6 with greater conductivity.

Figure 2:
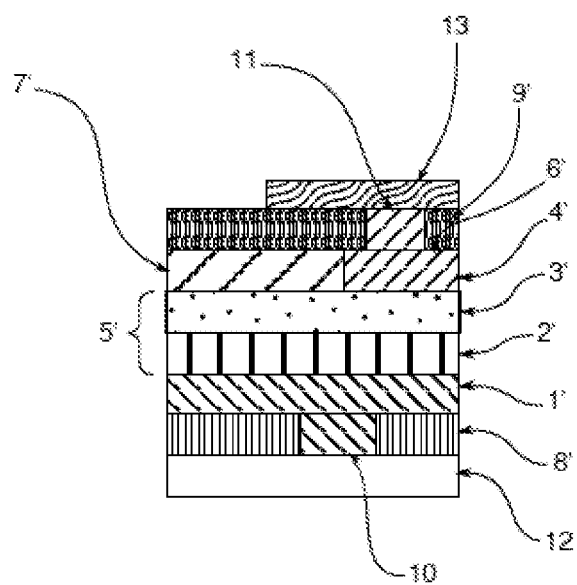

FIG. 2 represents a schematic, cross-sectional view of a male electroluminescent device according to an embodiment of the invention.

The male electroluminescent device according to the embodiments represented in FIGS. 2 to 6 conventionally comprise a male electroluminescent zone comprising a male core 5' consisting of a male electroluminescent layer 3' covering a male dielectric layer 2'. The male core 5' is sandwiched between two conductive layers: a first male conductive layer 1' in contact with the male dielectric layer 2' and a second male conductive layer 4' in contact with the male electroluminescent layer 3'. The second male conductive layer 4' comprises a transparent portion 7' and a portion 6' of which the conductivity is greater than that of the transparent portion 7'.

They further comprise a male adhesive layer 8' and a male protective layer 9'. They also comprise a male protective sheet 12' protecting the lower face of the male adhesive layer 8'.

Figure 3:
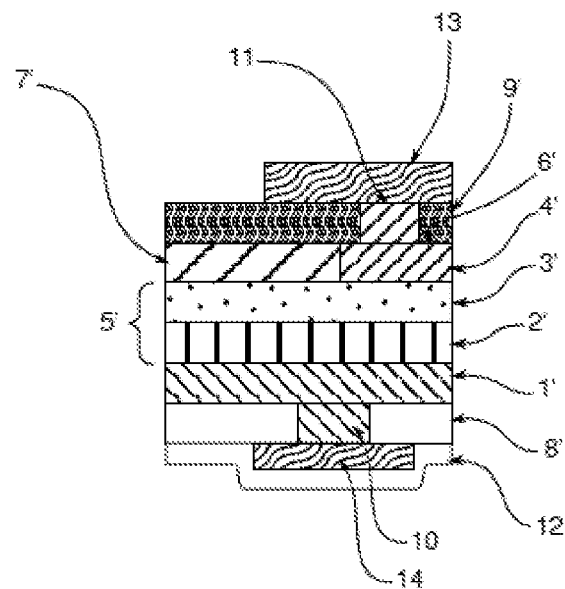
Figure 4:
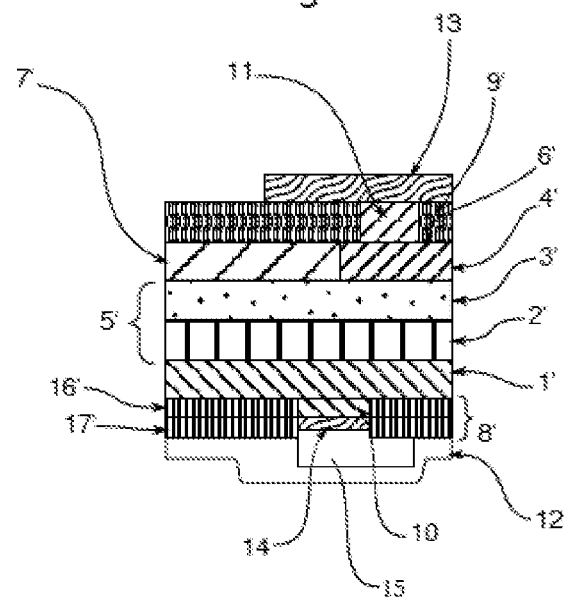

The male electroluminescent devices according to the embodiments represented in FIGS. 2 to 4 have a male adhesive layer 8' which comprises a first male connector 10 and a male protective layer 9' which comprises a second male connector 11. The first male connector 10 is in contact with the first male conductive layer 1' and the second male connector 11 is in contact with the second male conductive layer 4'.

The male electroluminescent device represented in FIG. 2 further comprises a second protective element 13' which fully covers the second male connector 11. The first male connector 10 is, itself, protected by the protective sheet 12.

The male electroluminescent device represented in FIG. 3 also comprises a second protective element 13 which fully covers the second male connector 11. The first male connector 10 is, itself, protected by a first protective element 14 at the level of the lower face thereof. The protective sheet 12 is placed under the male adhesive layer 8' by surrounding the first protective element 14.

The male electroluminescent device represented in FIG. 4 itself also comprises a second protective element 13' which fully covers the second male connector 11. The male adhesive layer 8' comprises a support film 16' and an adhesive film 17'. The first male connector 10 is itself protected by a first protective element 14 at the level of the lower face thereof. The first protective element is connected to a flap 15. The protective sheet 12 is placed under the male adhesive layer 8' by surrounding the first protective element 14 and the flap 15.

The male electroluminescent device represented in FIG. 5 comprises a male electroluminescent zone 26, a first male connection zone and a second male connection zone. It also comprises a male adhesive layer 8', a protective layer 9' and a protective sheet 12'.

The male electroluminescent zone 26 comprises a male core 5' comprising a male electroluminescent layer 3' covering a male dielectric layer 2'. The male core 5' is sandwiched between a first male conductive layer 1' and a second male conductive layer 4'.

The first male connection zone is represented in FIG. 5 to the left of the electroluminescent zone 26. In this first male connection zone, the male core 5' comprising a male electroluminescent layer 3' covering a male dielectric layer 2' is sandwiched between the first male conductive layer 1' and the second male conductive layer 4'. In the first male connection zone, a first male connector 10 is comprised in the adhesive layer 8'.

The second male connection zone is represented in FIG. 5 to the right of the electroluminescent zone 26. In this second male connection zone, only the protective sheet 12, the male adhesive layer 8', the second male conductive layer 4' and the male protective layer 9' being extended beyond the electroluminescent core of the electroluminescent zone 26. Thus, the second male conductive layer 4' covers the male adhesive layer 8'. In the second male connection zone, a second male connector 11 is comprised in the adhesive layer 8'. The second male connector 11 is in contact with the second male conductive layer 4'.

The male electroluminescent device represented in FIG. 6 comprises a male electroluminescent zone 26, a first male connection zone and a second male connection zone. It also comprises a male adhesive layer 8', a protective layer 9' and a protective sheet 12.

The male electroluminescent zone 26 comprises a male core 5' comprising a male electroluminescent layer 3' covering a male dielectric layer 2'. The male core 5' is sandwiched between a first male conductive layer 1' and a second male conductive layer 4'.

The first male connection zone is represented in FIG. 6 to the right of the electroluminescent zone 26. In this first male connection zone, only the protective sheet 12, the male adhesive layer 8', the first male conductive layer 1' and the male protective layer 9' being extended beyond the electroluminescent core of the electroluminescent zone 26. Thus, the first male conductive layer 4' covers the protective layer 9'. In the first male connection zone, a first male connector 10 is comprised in the protective layer 9'. The first male connector 11 is in contact with the first male conductive layer 4'. The first male connector is protected by a first protective element 14.

The second male connection zone is represented in FIG. 6 to the left of the electroluminescent zone 26. In this second male connection zone, the male core 5' comprising a male electroluminescent layer 3' covering a male dielectric layer 2' is sandwiched between the first male conductive layer 1' and the second male conductive layer 4'. In the second male connection zone, a second male connector 11 is comprised in the male protective layer 9'. The second male connector 11 is in contact with the second male conductive layer 4' at the level of the greater conductivity portion 7' thereof. The second male connector is protected by a second protective element 13.

FIG. 7 represents a schematic, cross-sectional view of the connection between the first conductive layer 1' of a male electroluminescent device 24 and the first conductive layer 1" of a female electroluminescent device 25 according to an embodiment of the invention. Only the connection zone is represented.

The male electroluminescent device 24 conventionally comprises a male electroluminescent zone comprising a core consisting of a electroluminescent layer 3' covering a dielectric layer 2. The core is sandwiched between two conductive layers: a first conductive layer 1' in contact with the dielectric layer 2' and a second conductive layer 4' in contact with the electroluminescent layer 3'.

The second conductive layer 4' comprises a transparent portion 7' and a portion 6' of which the conductivity is greater than that of the transparent portion 7'.

The male electroluminescent device 24 further comprises a male adhesive layer 8' and a male protective layer 9'.

The upper face of the male adhesive layer 8' is in contact with the first conductive layer 1. The male adhesive layer 8' comprises a first male connector 10.

The male adhesive layer 8' comprises a support film 16' covering an adhesive film 17.

The female electroluminescent device 25 conventionally comprises a female electroluminescent zone comprising a core consisting of a electroluminescent layer 3" covering a dielectric layer 2". The core is sandwiched between two conductive layers: a first conductive layer 1" in contact with the dielectric layer 2" and a second conductive layer 4" in contact with the electroluminescent layer 3".

The second conductive layer 4" comprises a transparent portion 7" and a portion 6" of which the conductivity is greater than that of the transparent portion 7.

The female electroluminescent device 25 further comprises a female adhesive layer 8" and a female protective layer 9".

The upper face of the female adhesive layer 8" is in contact with the first female conductive layer 1". The female adhesive layer 8" comprises a support film 16" covering an adhesive film 17".

The first female conductive layer 1" comprises a first extension 20 which extends beyond the core and the second conductive layer 4" of the electroluminescent zone of the female electroluminescent device. The first extension 20 is conductive.

The female adhesive layer 8" also extends beyond the core and the second conductive layer 4" of the female electroluminescent device and protects the entirety of the lower face of the first extension 20.

The female protective layer 9" also extends beyond the electroluminescent core and the second conductive layer 4' of the female electroluminescent zone. The extension of the female protective layer 9" beyond the second conductive layer 4" of the female electroluminescent device covers the first extension 20 and comprises a first female connector 22. The first female connector is in contact with the first female extension 20 and therefore ensures the electric continuity with the first female conductive layer.

The first female connector 22 is in contact with the first male connector 10 of the male electroluminescent device 24 such that the connection is ensured between the first conductive layers of the male 24 and female 25 electroluminescent devices.

A portion of the male adhesive layer 8' partially covers the female protective layer so as to ensure a mechanical connection between the male and female electroluminescent devices.

FIG. 8 represents a schematic, cross-sectional view of the connection between the second conductive layer 4' of a male electroluminescent device 24' and the second conductive layer 4' of a female electroluminescent device 25" according to an embodiment of the invention.

The male electroluminescent device 24' conventionally comprises a electroluminescent zone comprising a core consisting of a electroluminescent layer 3' covering a dielectric layer 2'. The core is sandwiched between two conductive layers: a first conductive layer 1' in contact with the dielectric layer 2' and a second conductive layer 4' in contact with the electroluminescent layer 3'. The second conductive layer 4' comprises a transparent portion 7' and a portion 6' of which the conductivity is greater than that of the transparent portion 7.

The male electroluminescent device 24' further comprises a male adhesive layer 8' and a male protective layer 9'.

The male adhesive layer 8' is in contact with the first male conductive layer 1' at the level of the upper face thereof. The male protective layer 8" is in contact with the second conductive layer 1' at the level of the lower face thereof. It comprises a second male connector 11.

The female electroluminescent device 25 conventionally comprises a electroluminescent zone comprising a core constituted of a electroluminescent layer 3" covering a dielectric layer 2". The core is sandwiched between two conductive layers: a first conductive layer 1" in contact with the dielectric layer 2" and a second conductive layer 4" in contact with the electroluminescent layer 3. The second conductive layer 4" comprises a transparent portion 7" and a portion 6" of which the conductivity is greater than that of the transparent portion 7".

The female electroluminescent device 25 further comprises a female adhesive layer 8" and a female protective layer 9"'.

The female adhesive layer 18' is in contact with the first conductive layer 1' at the level of the upper face thereof.

The second conductive layer 4" of the female electroluminescent device comprises a second extension 2' which extends beyond the core and the first conductive layer 1" of the female electroluminescent device. The first extension 21 is conductive.

The female protective layer 9"' extends also beyond the core and the first conductive layer 1" of the female electroluminescent device and covers the entirety of the upper face of the second extension 21. The female protective layer 9"' is non-conductive.

The female adhesive layer 8" also extends beyond the core and the first conductive layer 1" of the female electroluminescent device. The extension of the female adhesive layer 8" beyond the first conductive layer 1" of the female electroluminescent device is covered by the second extension 21 and comprises a second female connector 23.

The second female connector 23 of the female electroluminescent device 25 is in contact with the second male connector 11 of the male electroluminescent device 24 such that the connection is ensured between the second conductive layers of the male and female electroluminescent devices.

A portion of the female adhesive layer 8" covers a portion of the male protective layer 9'. Thus, the mechanical connection between the male 24 and female 25 electroluminescent devices is ensured.

The invention claimed is:

1. An electroluminescent assembly, comprising:
one male electroluminescent device, and
one female electroluminescent device,
the male electroluminescent device and the female electroluminescent device each comprising:
an electroluminescent zone, wherein
a core comprising a electroluminescent layer covering a dielectric layer is sandwiched between a first conductive layer and a second conductive layer,
the male electroluminescent device further comprising:
a first male connection zone, wherein a first male connector is in contact with the first conductive layer of the male electroluminescent device, and
a second male connection zone, wherein a second male connector is in contact with the second conductive layer of the male electroluminescent device;
the first male connector being connected to the first conductive layer of the female electroluminescent device, and
the second male connector being connected to the second conductive layer of the female electroluminescent device.

2. The male electroluminescent device according to claim 1, wherein:
the second male conductive layer comprises at least:
a male transparent portion, and
a portion of conductivity greater than the conductivity of the male transparent portion,
and wherein the second male connector is in contact with the portion of greater conductivity of the second male conductive layer.

3. A male electroluminescent device, comprising:
a male electroluminescent zone, wherein:
a male core comprising an electroluminescent male electroluminescent layer, covering a male dielectric layer, is sandwiched between a first male conductive layer and a second male conductive layer,
the male electroluminescent device further comprising:
a first male connection zone, wherein a first male connector is in contact with the first male conductive layer and is configured to be connected to a first female conductive layer of a female electroluminescent device, and
a second male connection zone, wherein a second male connector is in contact with the second male conductive layer and is configured to be connected to a second female conductive layer of a female electroluminescent device.

4. The male electroluminescent device according to claim 3, comprising a male adhesive layer, and/or a male protective layer.

5. The male electroluminescent device according to claim 4, wherein:
the first male connector is comprised in the male adhesive layer or the male protective layer, and
the second male connector is comprised in the male adhesive layer or the male protective layer.

6. The male electroluminescent device according to claim 5, wherein the first male connector and the second male connector are comprised in the male adhesive layer.

7. The male electroluminescent device according to claim 5, wherein the first male connector and the second male connector are comprised in the male protective layer.

8. A method for producing a electroluminescent assembly, comprising connecting the male electroluminescent device according to claim 3 to a female electroluminescent device to form a electroluminescent assembly.

9. A female electroluminescent device, comprising:
a female electroluminescent zone, wherein:
a female core comprising a female electroluminescent layer, covering a female dielectric layer, is sandwiched between a first female conductive layer and a second female conductive layer,
a first female connection zone, wherein the first female conductive layer comprises a first female extension which extends beyond the female core and which is configured to be connected to the first male connector of a male electroluminescent device, and/or
a second female connection zone, wherein the second female conductive layer comprises a second female extension which extends beyond the female core and which is configured to be connected to the second male connector of a male electroluminescent device.

10. A mixed electroluminescent device, comprising:
an electroluminescent zone, wherein:
a core comprising a electroluminescent layer covering a dielectric layer is sandwiched between a first conductive layer and a second conductive layer,
a first and a second male connection zone, the first male connection zone comprising a first male connector in contact with a first male conductive layer and configured to be connected to a first female conductive layer of a female electroluminescent device, the second male connection zone comprising a second male connector in contact with a second male conductive layer and configured to be connected to a second female conductive layer of the female electroluminescent device; and
a first and/or a second female connection zone, wherein the first female connection zone comprises the first female conductive layer comprising a first female extension which extends beyond a female core and which is configured to be connected to the first male connector, and wherein the second female connection zone comprises a second female conductive layer comprising a second female extension which extends beyond the female core and which is configured to be connected to the second male connector.

11. A method for producing a male electroluminescent device, comprising:
supplying a male adhesive layer, comprising a first male connector and/or a second male connector,
depositing on the male adhesive layer:
a first conductive layer,
a dielectric layer,
an electroluminescent layer, and
a second conductive layer,
such that:
the first male connector is in contact with the first male conductive layer, and/or
the second male connector is in contact with the second male conductive layer.

12. A method for producing a male electroluminescent device, comprising:

supplying a male protective layer (9'), comprising a first male connector and/or a second male connector, depositing on the male protective layer:
- a second conductive layer,
- an electroluminescent layer,
- a dielectric layer, and
- a first conductive layer, such that:
- the first male connector is in contact with the first male conductive layer, and/or
- the second male connector is in contact with the second conductive layer.

\* \* \* \* \*